United States Patent [19]

Kleimola

[11] 4,210,614
[45] Jul. 1, 1980

[54] PASSIVE CONTAINMENT SYSTEM

[75] Inventor: Frank W. Kleimola, Jackson, Mich.

[73] Assignee: Nucledyne Engineering Corp., Reed City, Mich.

[21] Appl. No.: 798,078

[22] Filed: May 18, 1977

Related U.S. Application Data

[60] Division of Ser. No. 548,744, Feb. 10, 1975, Pat. No. 4,050,983, and a continuation-in-part of Ser. No. 383,485, Jul. 30, 1973, Pat. No. 3,984,282, which is a continuation of Ser. No. 61,063, Aug. 5, 1970, abandoned.

[51] Int. Cl.² .......................... B01F 3/04; G21C 15/12
[52] U.S. Cl. .................................. 261/124; 137/68 R; 176/38; 176/65; 176/87; 261/62; 261/64 B; 261/123B
[58] Field of Search ................... 261/62, 64 B, 74, 77, 261/122–124, DIG. 10, DIG. 13, DIG. 76, 69 R; 176/37, 38, 87, 65; 165/60; 137/68 R, 70, 71

[56] References Cited

U.S. PATENT DOCUMENTS

| | | | |
|---|---|---|---|
| 1,338,592 | 4/1920 | Sanford | 261/64 B |
| 2,945,685 | 7/1960 | Bowlus | 261/62 |
| 3,081,289 | 3/1963 | Cheney et al. | 261/123 X |
| 3,168,445 | 2/1965 | Ziegler et al. | 176/65 X |
| 3,224,170 | 12/1965 | Iwanaga et al. | 261/123 X |
| 3,228,526 | 1/1966 | Ciabattari et al. | 261/123 X |
| 3,232,843 | 2/1966 | Went et al. | 176/65 X |
| 3,405,920 | 10/1968 | Lefrancois | 261/123 |
| 3,528,884 | 9/1970 | Collier et al. | 176/38 X |
| 3,718,539 | 2/1973 | West et al. | 176/38 X |

*Primary Examiner*—Richard L. Chiesa
*Attorney, Agent, or Firm*—Lon H. Romanski

[57] ABSTRACT

A containment system that provides complete protection entirely by passive means for the loss of coolant accident in a nuclear power plant and wherein all stored energy released in the coolant blowdown is contained and absorbed while the nuclear fuel is prevented from over-heating by a high containment back-pressure and a reactor vessel refill system. The primary containment vessel is restored to a high sub-atmospheric pressure within a few minutes after accident initiation and the decay heat is safely transferred to the environment while radiolytic hydrogen is contained by passive means.

7 Claims, 14 Drawing Figures

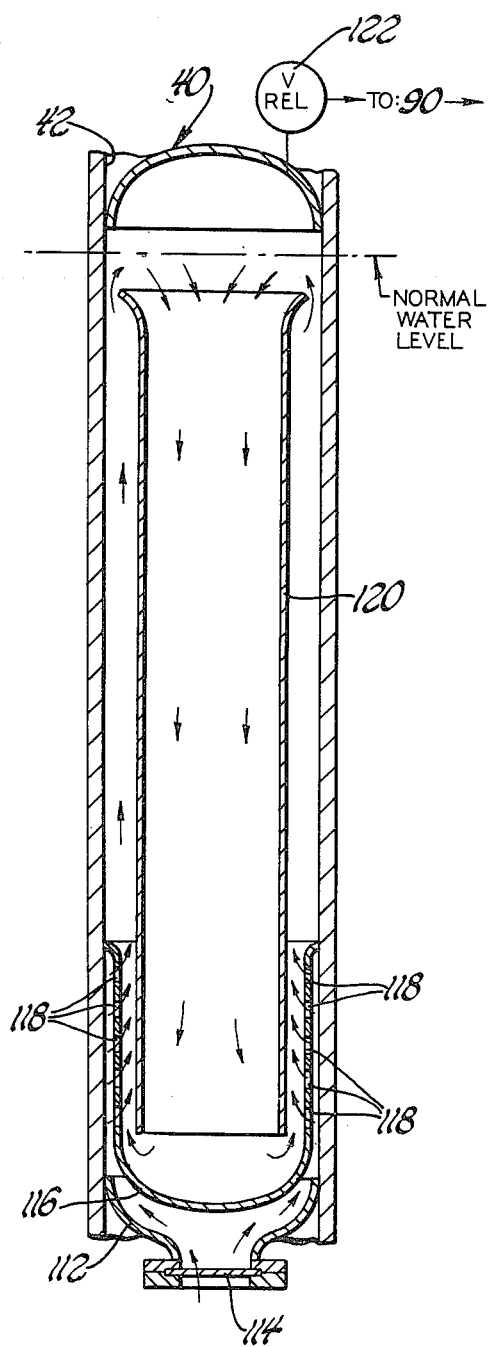
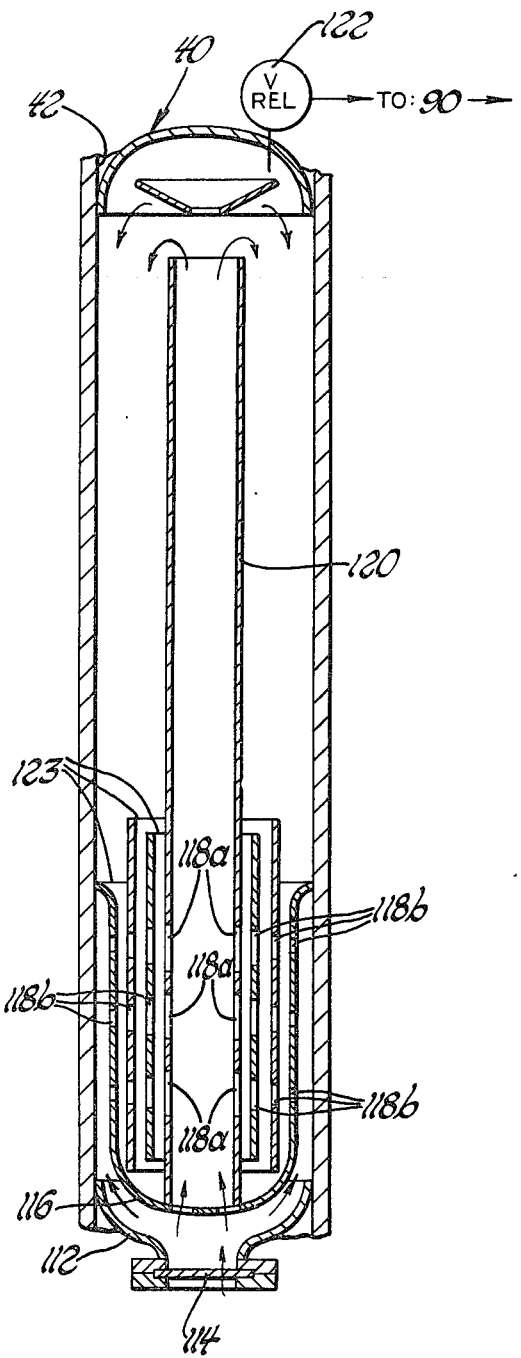
Fig. 9
Fig. 10

PASSIVE CONTAINMENT SYSTEM

RELATED APPLICATION

This is a Division of application Ser. No. 548,744 filed Feb. 10, 1975, now U.S. Pat. No. 4,050,983, and a Continuation-in-Part of my copending application Ser. No. 383,485, filed July 30, 1973, now U.S. Pat. No. 3,984,282, which, in turn, is a Continuation of my application Ser. No. 61,063 filed Aug. 5, 1970, and now abandoned, for PASSIVE CONTAINMENT SYSTEM.

BACKGROUND OF THE INVENTION

1. Field of the Invention

Nuclear power plants are required by practice to be designed in such a manner that the health and safety of the public is assured even for the most adverse accidents that may be postulated. For plants utilizing light water as a coolant, the most adverse accident is considered to be a double-ended break of the largest pipe in the reactor coolant system and is termed, Loss of Coolant Accident (hereinafter sometimes referred to as LOCA).

For accident protection, these plants utilize containment systems that are designed to physically contain water, steam and any entrained fission products that may escape from the reactor coolant system. The containment system is usually considered to encompass all structures, systems and devices that provide ultimate reliability in complete protection for any accident that may occur. Engineered safety systems are specifically designed to mitigate the consequences of an accident. Basically, the design goal of a containment system is that no radioactive material escapes from the nuclear power plant in the event of an accident so that the lives of the surrounding populace are not endangered.

The passive containment system herein disclosed provides this level of protection for a loss of coolant accident and for the other types of accidents that are considered as a basis of design, and is considered to be effective for nuclear power plants employing boiling water reactors.

2. The Prior Art

Prior art techniques have utilized pressure suppression containment for the boiling water reactors. The pressure suppression containment consists of a drywell that houses the reactor coolant system, a pressure suppression chamber containing a pool of water and a vent system connecting the drywell to the pool of water. This containment structure is usually either constructed of steel enclosed by reinforced concrete or is steel-lined with reinforced concrete. The pressure suppression containment is housed within a reactor building.

In the event of a LOCA, the reactor coolant partially flashes to steam within the drywell, and the air, steam and liquid coolant flow through the connecting vents into the pool of water in the suppression chamber. The steam is condensed by the water and decreases the potential pressure rise in the containment. The air rises into the free space above the pool of water in the suppression chamber.

Refinements in pressure suppression containment utilizing water includes the inerting of the containment atmosphere. Inerting is aimed at preventing the burning of hydrogen evolved from metal-water reactions of overheated nuclear fuel.

The pressure-suppression containment is a passive structure that requires support systems for accident containment. Active systems such as residual heat removal systems and spray systems are used to dissipate heat to the environs. This prevents the containment design pressure and temperature from being exceeded and, in the process, the containment pressure is reduced to thereby limit the leakage of fission products. Active filtration systems are at times utilized in conjunction with the spray systems to reduce fission product concentration in the containment atmosphere. This also limits the amount of fission products that can leak out of the containment to the environs. Hydrogen recombiners are also utilized to protect the containment from developing explosive concentration of hydrogen.

To be effective, the pressure suppression containment thus requires active engineered safety systems that provide emergency cooling of the nuclear fuel. Active engineered safety systems are inherently required to function effectively in order to maintain the integrity of the containment system in the LOCA. Active systems require high integrity instrumentation and control equipment, rotating machinery, electric power sources and power distribution equipment. These systems need to function properly as part of a larger system under adverse containment environment conditions of high pressure, high temperature, high humidity, high radioactivity and eroded thermal insulation.

Malfunctioning of any active engineered safety system imposes even more adverse conditions on the operable system. For instance, an inadequate source of electric power may result in the malfunctioning of the emergency core cooling system for the nuclear fuel. Overheating of the fuel can result in melting of the fuel cladding with metal-water reactions occurring. The fuel core may slump and portions could collapse and overheat the bottom of the reactor vessel. Hydrogen is, in turn, released from metal-water reactions and is subject to burning. The added energy from the metal-water reactions and from the burning of hydrogen imposes even more severe requirements on the containment structure. Overheating of the fuel and melting of the clad results in a gross release of fission products that are available for leakage out of the containment system. This example points to the critical nature of active engineered safety systems that are an essential part of the containment system of the prior art.

SUMMARY OF THE INVENTION

Generally, this invention relates to a nuclear reactor containment arrangement and, more particularly, relates to an entirely passive containment system which encloses a reactor system which uses a high pressure, high temperature coolant and/or moderator such as light or heavy water.

In one aspect of the invention, the passive containment system is employed to safely contain even the most adverse reactor accident as wherein a sudden rupture of the reactor piping occurs resulting in the loss of coolant accident (LOCA). The passive containment system herein provides protection for nuclear reactor systems of the boiling water type.

Generally, the passive containment system for the boiling water reactor comprises interconnected cells with each cell housing a major component of the nuclear reactor system such as, for example, reactor vessel, pumps and piping. Within the containment cells a primary container formed as from interconnected steel shells encloses the entire reactor coolant system. The primary container, in turn, is encased by reinforced or prestressed concrete.

Deluge tanks and reactor refill tanks are located entirely within the containment cells at an elevation above the reactor piping and are water-filled. Safety relief devices, mounted as on the top head of each deluge tank, discharge into a deep well.

The deluge tanks contain chilled water and a predetermined freeboard space. Both chilled water and hot water refill tanks are utilized with the water in each refill tank being under hydrostatic pressure.

The deep well surrounds the reactor vessel containment cell and extends downwardly below the reactor vessel. The steel-lined deep well containing fluid is encased by reinforced concrete and/or prestressed concrete.

The water used within the deluge tanks, within the reactor vessel refill tanks and within the deep well is specially treated for accident containment purposes. The water is degassed and contains chemicals in solution that serve as a poison to neutrons, inhibitors of corrosion, oxygen "getters" and radionuclide "getters".

The passive containment system is normally housed within a reactor building. The arrangement of the cell structures permits the location of spent fuel storage pools and a refueling cavity within the reactor building. Heat exchange units within the primary containment pipe cells and within the spent fuel storage pools are piped to heat exchange units in an outdoor body of water.

In a typical response of the passive containment system hereof to a LOCA, decompression of the reactor coolant through the pipe break produces steam within the primary container that is normally maintained at a high vacuum. The steam pressurizes the container and, at a preset pressure, bursts rupture disks at the deluge tanks. Steam carryover into the deluge tank ensues. The steam carryover and thermal expansion causes the deluge tanks to become "water-logged". With the tanks being so "water-logged", the confined volume of the primary container is increased in pressure until the coolant blowdown is arrested by the container back-pressure. The primary container is designed so that the coolant blowdown is arrested by the container back-pressure with a sufficient amount of fluid still retained in the reactor coolant system to keep the nuclear fuel intact.

Before the reactor coolant blowdown is terminated by the back-pressure, the hydrostatic pressure within the chilled water refill tanks causes check valves at the interconnecting piping to lift and treated water is injected into the reactor coolant system. The decompression of the refill tanks causes fluid flow to initiate in the headers located between the hot water refill tanks and the chilled water refill tanks. Steam from the hot water refill tanks flows through jet injectors in the cold water; steam flow through the injectors entrains treated water from the chilled water refill tanks. The steam and water are intimately mixed on passage through the diffuser section of the injector to provide a homogeneous solution of treated water that refills the reactor vessel.

The chilled water in the elevated deluge tanks quenches the steam carryover during coolant blowdown at the container back-pressure increases to arrest the blowdown. With coolant blowdown arrested a gravity deluge from the deluge tanks completely submerges the reactor piping and refills the reactor coolant system through the pipe break that resulted in loss of coolant. All stored energy within the reactor system is absorbed by the deluge water. Sufficient heat capacity is provided in the deluge water to reduce temperatures to low levels so that the primary container atmosphere is restored to the normal high vacuum condition by the deluge. Any leakage from the primary container during the blowdown and deluge is contained within the reactor building. Any overpressure of the primary container during the blowdown is relieved to the water in the deep well.

The continued energy release as decay heat from the nuclear fuel is passively transferred to the environs by thermal conduction and natural convection. This heat is first transferred by convection from the fuel to the reactor coolant and then by conduction through uninsulated metal walls of the reactor system to the deluge water in the primary container. Heat exchange units in the containment pipe cells are connected by piping to heat exchange units in an outdoor body of water and thus heat is transferred by conduction and convection to such outdoor body of water.

The passive containment system arrangement of the invention permits the spent fuel storage pools and reactor auxiliary systems and components to be housed within the reactor building. This arrangement also lends itself to passive heat exchange circuits that are connected to heat exchange units located at a spent fuel storage pool and at the reactor auxiliary systems and components. These passive heat exchange units reject heat to the outdoor body of water.

GENERAL OBJECTS OF THE INVENTION

A general object of this invention is to provide a new and improved containment method for any energy, toxic or radioactive materials released from a process system accommodated therein.

A more specific object of the invention is to provide a passive containment process and apparatus for a nuclear reactor assemblage.

Another object of the invention is to provide functional improvements in the complete containment of a nuclear reactor system through strictly passive means entirely actuated, controlled, powered and maintained by the forces in nature that are designed to be intrinsic to the containment system.

A further object of the invention is to provide a reactor containment system that is less expensive to construct in that the primary containment free volume is effectively reduced, less expensive materials are required, and active safety systems currently used in reactor containment systems are eliminated.

Still another object of this invention is to provide a containment system that permits an improvement in the structural and equipment arrangements to provide compactness in design.

Another object of this invention is to provide an absolutely reliable containment system for the nuclear reactor assemblage accommodated therein to permit greater freedom in the siting of nuclear power plants in order to substantially reduce the costs of supplying electric power to a metropolitan community.

A further object of the invention is to provide a passive containment system that is compatible with the accidents that are the basis of design including the loss of coolant accident including a double-ended rupture of the largest pipe in the reactor coolant system.

A still further object of the invention is to provide a passive containment system that permits a structural and equipment arrangement that is compatible to withstanding the additional forces imposed by natural phenomena such as snow and ice loads, hurricanes, tornadoes, flooding conditions such as tsunami and seiches, and earthquakes and, as well, provides protection in depth to, for example, external missiles and airplane collisions.

Another object of the invention is to provide a passive containment system that harnesses the forces of physics to provide the ultimate level of reliability in the containment of nuclear power plants.

Still another object of the invention is to provide passive emergency core cooling utilizing high containment back-pressure, reactor vessel refill, containment deluge, residual heat transfer and an ultimate heat sink for the loss of coolant accident.

Yet another object of this invention is to provide a containment system that permits full scale tests of the effectiveness of emergency core cooling in the loss of coolant accident.

Among others, a further object of the invention is to provide a containment system that permits plant recovery from all design basis accidents including the loss of coolant accident.

Other objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 9 illustrates in enlarged scale, and in vertical cross-section one embodiment and arrangement of a deluge tank;

FIG. 10 illustrates, also in enlarged scale and in vertical cross-section, another embodiment and arrangement of a deluge tank;

DETAILED DESCRIPTION OF THE PREFERRED EMBODIMENTS

Figure 1:
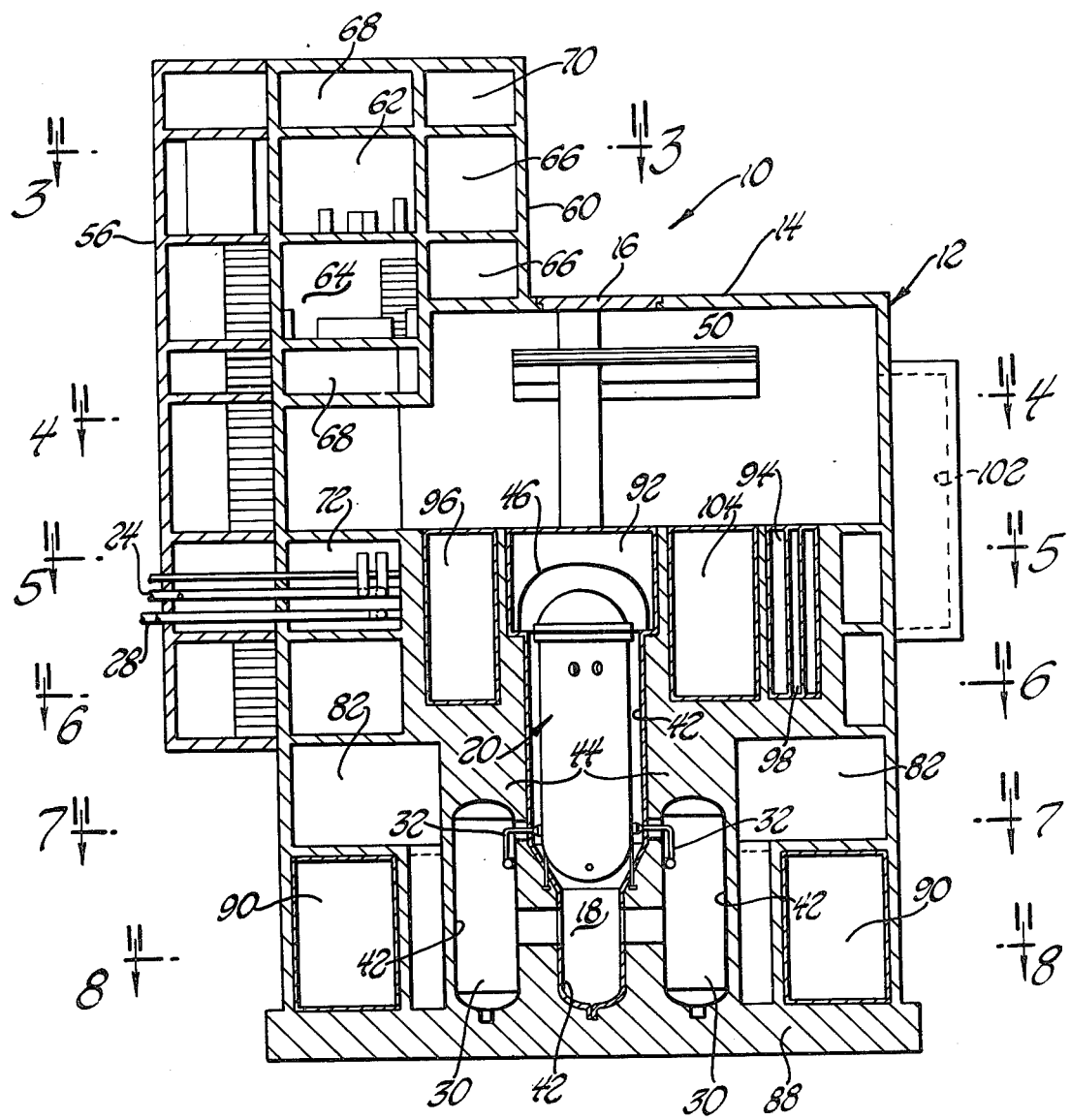
FIG. 1 is generally a vertical cross-sectional view of the reactor building arrangement, for a passive containment system embodying the teachings of the invention, taken generally through the spent fuel pools and the reactor internals laydown area sandwiching the reactor refueling cavity as generally indicated by the plane of line 1—1 of FIG. 3 and looking in the direction of the arrows.
Figure 2:
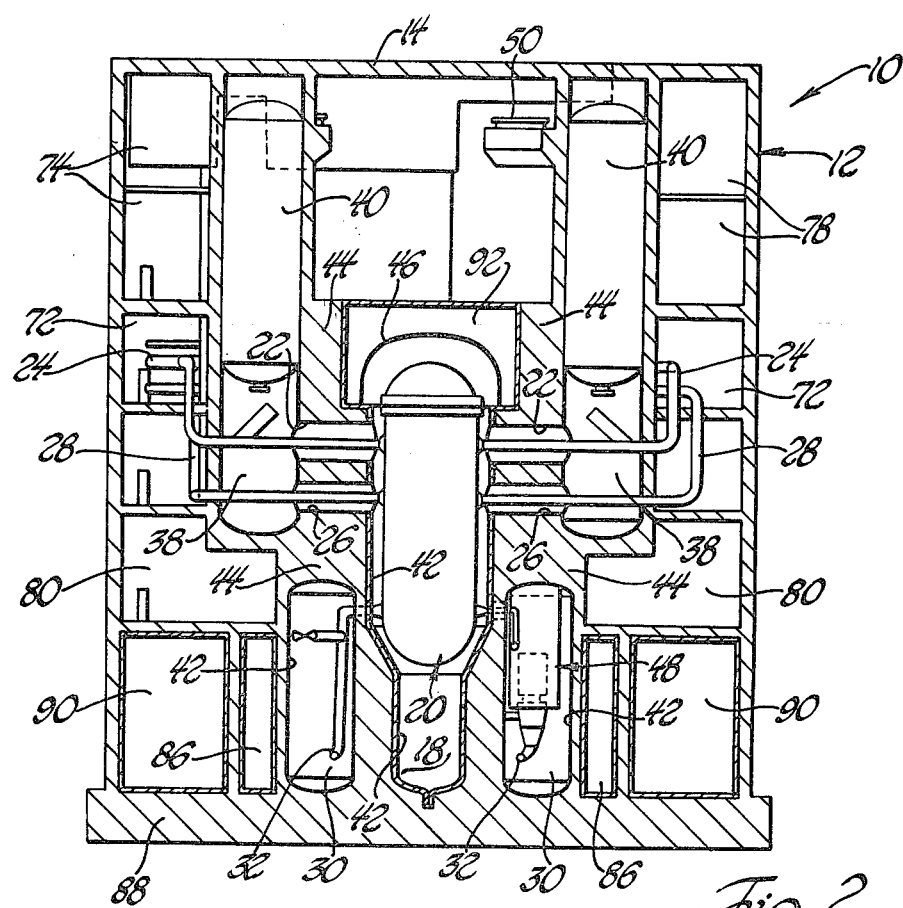
FIG. 2 is generally a vertical cross-sectional view of the reactor building arrangement, for a passive containment system embodying the teachings of the invention, taken generally through two deluge tank cells, a reactor water recirculation system cell, the reactor vessel cell, two steamline cells and two feedwater line cells as generally indicated by the plane of line 2—2 of FIG. 3 and looking in the direction of the arrows.
Figure 3:
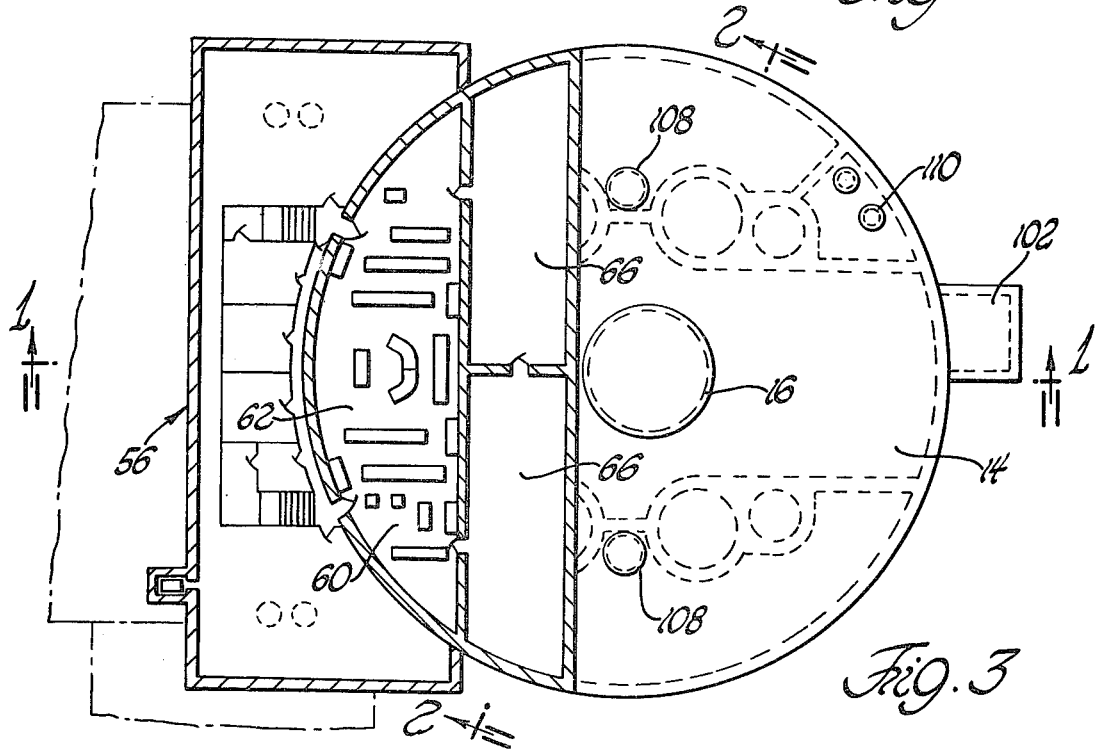
FIGS. 3, 4, 5, 6, 7 and 8 are cross-sectional views respectively taken generally on the planes of lines 3—3, 4—4, 5—5, 6—6, 7—7 and 8—8 of FIG. 1 and looking in the directions of the arrows.

Referring now in greater detail to the drawings, and in particular to FIGS. 1–8, a nuclear power plant assemblage 10 is illustrated as comprising a reactor building 12 having a reactor building roof 14 provided with a removable roof closure 16.

The primary reactor containment comprises interconnected cells that, in turn, enclose the reactor coolant system components. That is, a reactor vessel cell 18 houses the reactor vessel 20. Each of four steamline cells 22 encloses a steamline 24 while four feedwater line cells 26 each house a feedwater line 28. A reactor water recirculation system cell 30 houses the reactor water recirculation system 32.

Refill tank cells 34 (FIGS. 5 and 6) contain the reactor vessel refill tanks 36a and 36b. The bottom end of each refill tank cell is seal welded to a support skirt which is a part of the primary containment. The refill tank piping cells are connected to the adjacent feedwater line cells 26.

Deluge tank cells 38 house the deluge tanks 40 and the bottom end of each deluge tank is preferably seal welded to a support skirt which is part of the primary containment. The deluge tank cells 38 are connected to the adjacent steamline cells 22.

The containment cells are constructed from steel and concrete and a continuous steel liner 42 provides form to the interconnected cells. The free space within the cells permits access for the maintenance of reactor components. Internal stiffening rings are employed on the cylindrical steel shells or liners 42 to provide the required moment of inertia for the external pressure that is subjected onto the cells that form the primary containment. Reinforcement rings are also employed as at the interconnections between the piping cells and the major equipment cells.

The cells provide ready means for the installation of piping supports and restraints that preclude damage to the primary reactor containment and other components from the movement of a failed pipe (as by pipe whip) in the event of a LOCA. The stiffening rings are also closely spaced providing added protection for the steel liner. Major components are protected against movement, as in an earthquake, by suitable stablizing means.

During operation, at power, the free space within the primary reactor containment is maintained at a high vacuum to thereby eliminate the need for thermal insulation at the exterior surfaces of the reactor coolant system. During reactor shutdown, as for maintenance operations, air at atmospheric pressure is circulated within the primary reactor containment utilizing the vacuum lines penetrating the containment.

During an extended reactor shutdown, personnel entry is made into the primary reactor containment for maintenance and inspection operations. Before actual entry, however, the containment free volume is purged through high efficiency filters and activated carbon beds. Steel pieces are installed between the primary containment vacuum headers and the containment ventilation system to thereby provide a ventilated atmosphere.

Most all of the primary reactor containment is enclosed by a concrete structure 44 (either prestressed or reinforced as determined in the design detail) except generally above the reactor vessel 20 where a flanged shroud means 46 encloses the top of the reactor vessel 20.

The concrete structure 44 immediately encasing the primary reactor containment offers structural support for the containment cells and for the reactor coolant system components housed therein. A sufficient thickness of structural concrete is provided throughout to also serve as biological shielding. Protection against penetrating radiation is thus provided to occupants within the reactor building for both normal reactor operation and for all accidents within the primary reactor containment including the LOCA.

A number of compartments are utilized within the primary reactor containment.

Each reactor water recirculation system pump is compartmented as to thereby enable the motor compartments 48 to be supplied with either an air or inert gas atmosphere while the remainder of the free space (free volume) in the containment can be maintained either at a high vacuum or at atmospheric pressure.

A shroud separates the pump cell into two compartments. The shroud is seal welded to the pump casing and to the reactor water recirculation system cell liner to form the motor compartment.

The containment steel liner 42 at the motor compartment is completely seal welded. The liner can be readily cut to provide for the replacement of a pump motor through the closure located directly above the motor. After pump replacement the liner is rewelded into place. A flanged and bolted manhole provides access into the pump motor compartments for inspection, tests and maintenance operations. Process piping, electrical instrumentation and control circuits are routed from the motor compartment through special penetrations.

Either an air or an inert gas atmosphere is supplied to each motor compartment. For personnel access, air is provided to the compartment. For reactor operation the air can be replaced with an inert gas. In addition to improving the transfer of heat from the motors, the inert gas prevents the potential burning of electric instrumentation and control leads. Also, the inert gas provides protection against the combustion (burning) of the lubricating oil at the pump motors during normal operation or in a LOCA.

The reactor vessel refill tanks 36a, 36b and the deluge tanks 40 contain neutron poison in solution. The contents of the tanks are maintained at a low temperature utilizing mechanical refrigeration units. A sufficient amount of fluid is provided within the refill tanks 36a, 36b to overflow the reactor vessel 20 on refill after a LOCA. The deluge tanks 40 contain a sufficient amount of fluid to fill the primary reactor containment free volume to an elevation above any reactor coolant system pipe break.

Secondary containment is provided by the reactor building 12 which is designed to be operated normally at a slight vacuum. The primary reactor containment system cells along with attendant auxiliary containment system enclosures, low pressure auxiliary systems, radwaste storage tanks, refueling pools, and reactor service systems are completely housed within the reactor building.

The reactor building is circular in shape and of reinforced concrete construction. The building has a roof 14 that is supported by the building outside walls, by the refill tank cells 34 and the deluge tank cells 38.

A refueling crane is also supported by the refill tank cells and the deluge tank cells. Recesses at the cells provide mounting for the crane rails 50.

Figure 4:
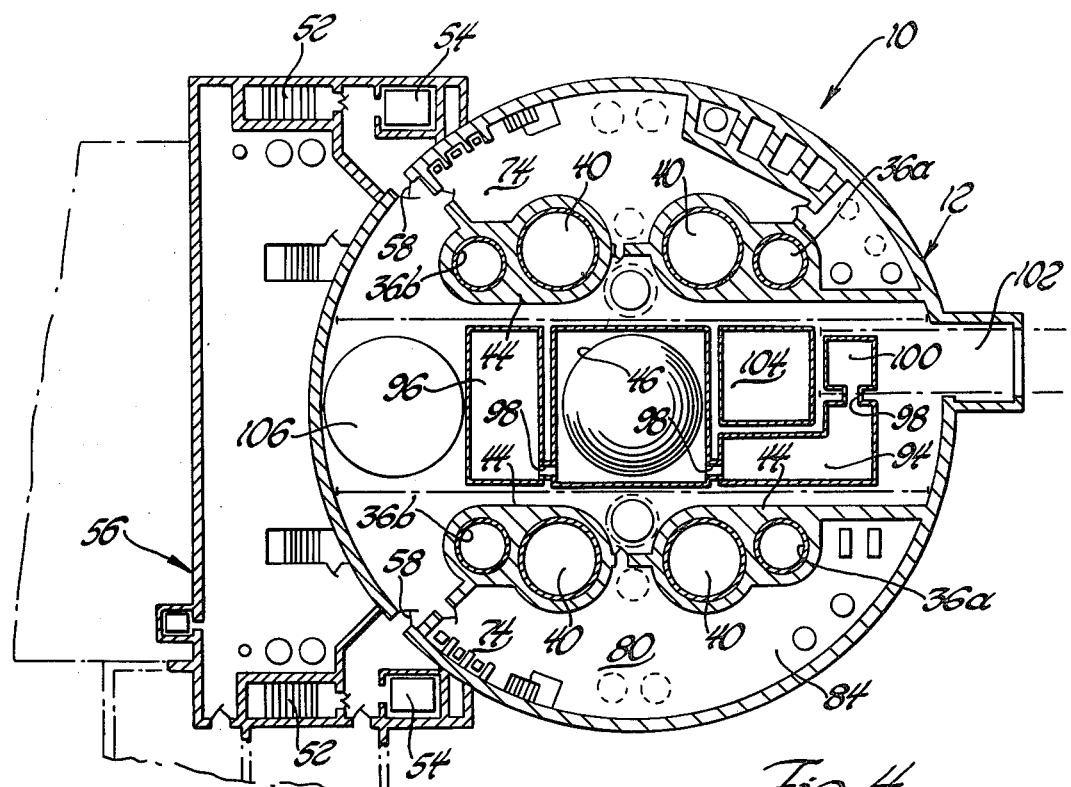
Figure 5:
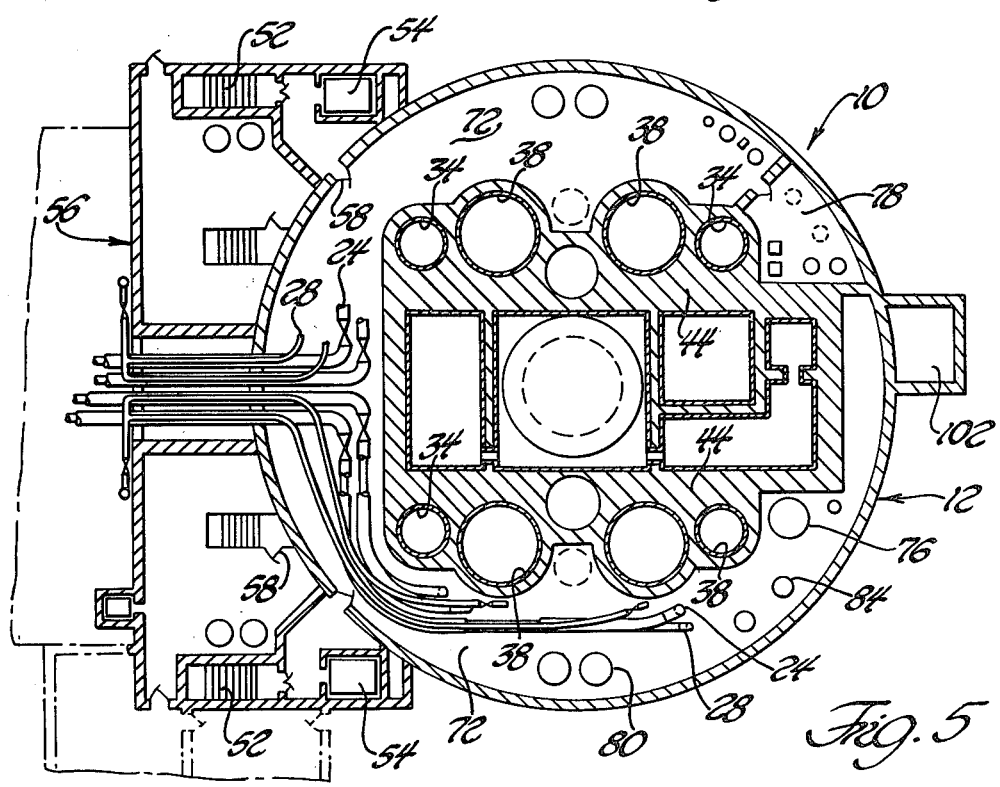
Figure 6:
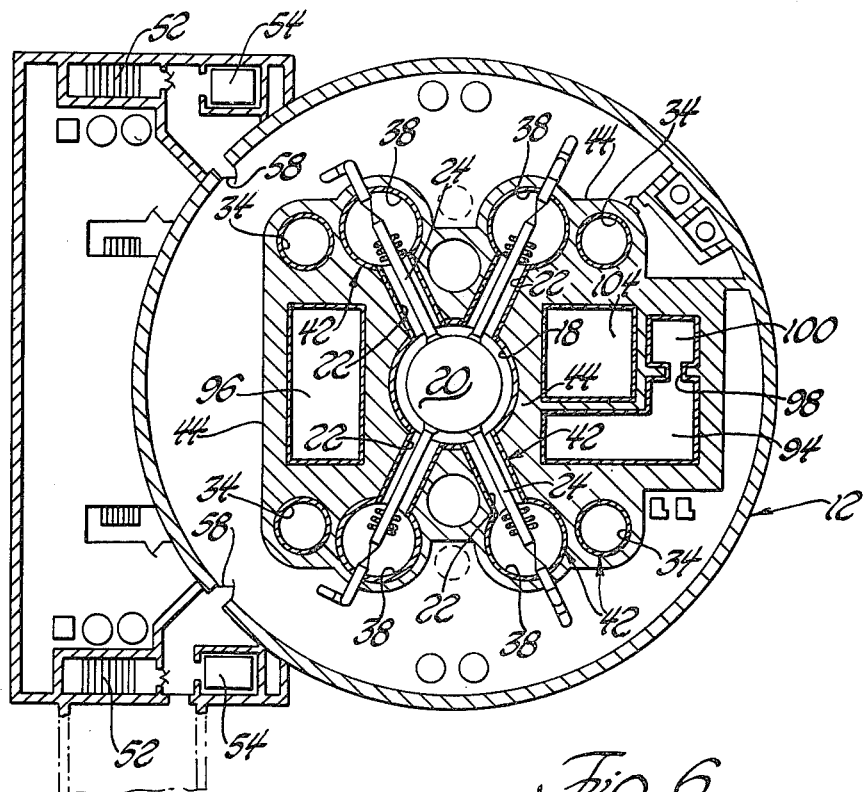
Figure 7:
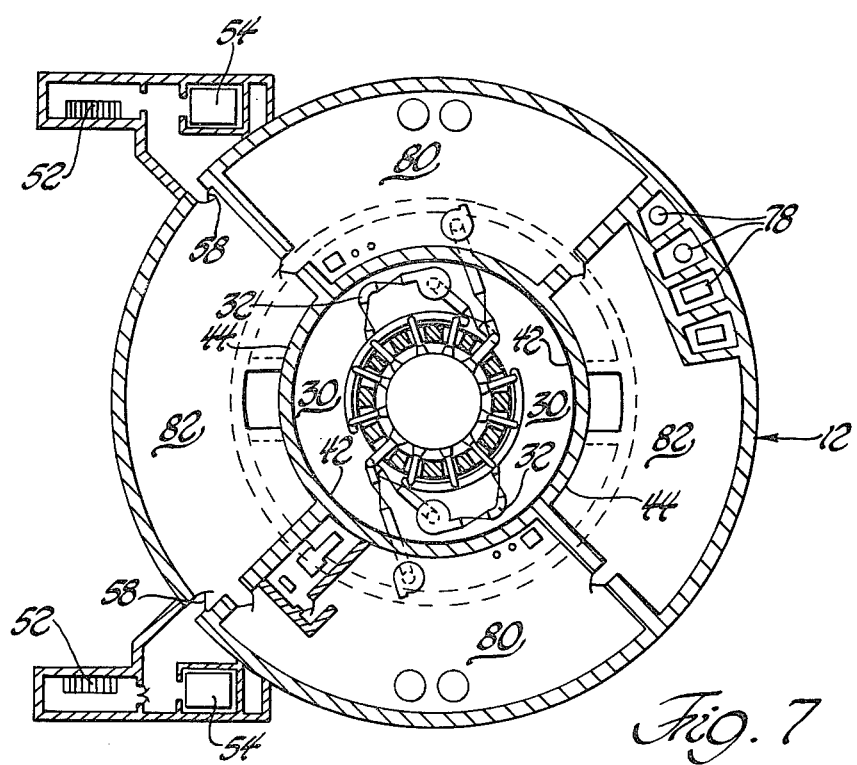
Figure 8:
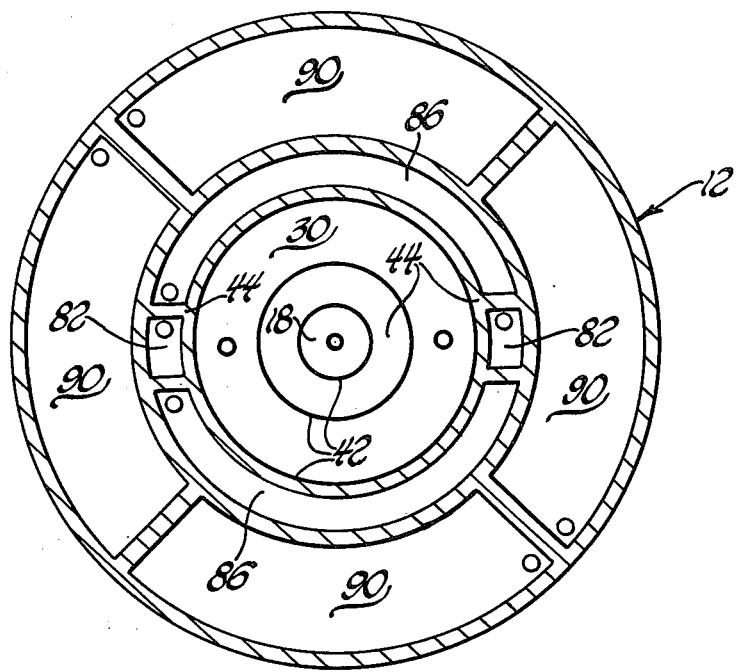

Personnel access means are not provided between floor elevations within the reactor building; access to each floor elevation is obtained via stairways 52 and elevators 54, located within an intermediate building 56 (FIG. 4). At each floor elevation mechanically interlocked doors 58 provide personnel access into the reactor building.

Individual heating, ventilating and air conditioning units (not shown) are provided at each floor elevation. The units are designed for the recycling of air with make-up air held to a minimum. Each unit is designed to maintain a slight negative pressure in the equipment areas. Any radioactivity accidentally released into an equipment area is vented to the environment under controlled conditions through high efficiency filters and activated carbon beds after a sufficient decay period.

A control complex 60 is located at the top of the reactor building 12. Even though the control complex is an integral part of the reactor building, it is not encompassed in the secondary containment system (i.e., the reactor building). There is not a direct access from the reactor building into the control complex; access is obtained through intermediate building 56 to prevent contamination in an accidental release of radioactivity. The control complex comprises a control room 62, a computer and relay room 64, a switchgear room 66, cable spreading areas 68, and a heating, ventilating and air conditioning room 70.

Within the reactor building 12 the primary reactor containment cells are immediately surrounded by enclosures which provide auxiliary containment. An auxiliary containment system prevents the uncontrolled release of radioactivity to the environment from any postulated accidents other than the LOCA at the reactor coolant pressure boundary. The reactor building also provides secondary containment for an accidental release of radioactivity in the auxiliary containment system.

In the auxiliary containment system an enclosure 72 is provided for steamlines 24, feedwater lines 28, and vacuum lines. These lines emerge from the primary reactor containment via the deluge tank cells, traverse the enclosure and exit out of the reactor building. Isolation valves are installed on these lines immediately inside the reactor building. Enclosures are also provided for the reactor building atmosphere cleanup system 74, the standby liquid control system 76, the reactor water cleanup system 78, the residual heat removal system 80, the control rod drive hydraulic control units 82 and the spent fuel pool cooling system 84. Radwaste storage 86 is provided by steel-lined, reinforced concrete enclosures positioned on the reactor building foundation mat 88.

A steel-lined, reinforced concrete enclosure sectioned into four compartments forms the deepwell 90. Water from one of the deepwell compartments is utilized to fill the reactor refueling cavity during fuel replacement. The enclosure contains a large volume of water that serves as a general purpose heat sink. This heat sink is a depository for the mass and energy carryover during blowdown resulting from an overpressure transient in a structure, system or component within the reactor building. The pressure transients include those occurring during normal operation, as well as those occurring during any postulated accident. Sufficient freeboard space is allotted at the deepwell for the expansion in water volume which results from fluid carryover and thermal expansion of the deepwell water. The air within the freeboard space is evacuated for normal operation.

The deepwell 90 provides a heat sink for overpressure blowdown from the reactor coolant system (i.e., steam exiting through the safety-relief valves on the steamlines 24), the standby liquid control system, the reactor water cleanup system, the residual heat removal system, the primary reactor containment, the auxiliary containment enclosures, and from any individual component subject to over-pressure. The over-pressure discharge from these structures, systems and components is directed through vent lines which are routed into the deepwell through the reinforced concrete structure 44 surrounding the primary reactor containment.

The reactor refueling area includes the reactor refueling cavity 92, spent fuel pool 94 and the standby spent fuel pool 96. Refueling gates 98 installed at either side of the reactor refueling cavity isolate the pools from the cavity. The reactor refueling cavity and the two fuel pools are filled with water for normal operation.

The spent fuel pool and the standby pool together are sized for the storage of at least one and two-thirds (1⅔) core loadings of reactor fuel. The spent fuel pool is utilized for normal refueling operations and the standby pool is utilized when the entire reactor core is unloaded.

The spent fuel pool is connected to an adjoining spent fuel cask pit 100 through a channel equipped with a gate. The pit can be drained and utilized as a decontamination pit after spent fuel is loaded into the spent fuel shipping cask. After decontamination, the cask is moved out of the reactor building by rail via the cask transfer lock 102.

At the refueling elevation a bridge and trolley are provided for reactor refueling and spent fuel handling operations.

The reactor refueling area has sufficient laydown area 104 for the underwater storage of the reactor vessel internals during reactor refueling operations; the flanged shroud 46 and the reactor vessel head are stored on a missile shield and transferred to the far side of the standby spent fuel pool 106 from over the reactor refueling cavity 92 for refueling operations.

The reactor building including all internal concrete structure can be constructed prior to the delivery of reactor coolant system components to the construction site. Besides providing openings into the reactor building at the cask transfer lock, and at all of the floor elevations for personnel as well as for equipment, openings are also provided at the reactor building roof. The roof openings, respectively fitted with closures 16, 108 and 110, are provided for the reactor vessel, the reactor water recirculation pumps, and for heat exchangers. Faulted components can also be retrieved through the roof closures.

FIG. 9 illustrates one particular arrangement of a deluge tank 40. The bottom head 112 is flared to receive a large diameter welded end flange; a rupture disk 114 is mounted between the mating flanges. The rupture disk is designed to withstand the head of water in the tank under design seismic loadings. Knife blades (not shown) within the tank immediately above the rupture disk sever the disk in a fixed pattern on an upward movement of the disk 114. This upward movement bursts the rupture disks at a preset pressure within the primary reactor containment in a loss of coolant accident. A second dished head 116 is positioned within the tank immediately above the knife blades. This head is perforated with a multitude of small diameter holes 118 that serve as flow orifices positioned in the straight flange region of the dished head. The total flow area provided at a deluge tank by the small diameter holes is appreciably greater than the rupture disk area.

Within each deluge tank an open-ended concentric cylinder 120, almost the full height of the deluge tank, promotes thermal circulation of the water in the tanks during steam carryover. This thermal circulation is designed to quench the steam carryover immediately after passage through the small diameter holes. The diameter of the open cylinder is sized for two equal flow areas; i.e., the cylinder area is approximately equal to the flow area between the cylinder 120 and the inside diameter of the deluge tank 40. Also, the bottom end of the open cylinder is spaced from the dished head 116 so as to provide a flow area again approximately equal to that in the cylinder 120. The top end of the cylinder is positioned below the water surface again to provide equal flow area. The flow orifices 118 in the straight flange region of the internal dished head 116 are positioned within the flow annulus between the open cylinder 120 and the deluge tank 40. Steam carryover through these small openings is designed to promote thermal circulation of the water in the deluge tank.

In the loss of coolant accident the volume of water within the deluge tank expands from the mass of steam carried over and from the thermal expansion of the contained water until the expanded volume prevents continued steam carryover. With steam carryover restricted, the primary reactor containment increases in pressure until blowdown from the reactor coolant system is arrested by the high back-pressure in the containment. Safety relief valves 122 provide over-pressure protection for the deluge tanks 40 and for the primary reactor containment 42.

Figure 11:
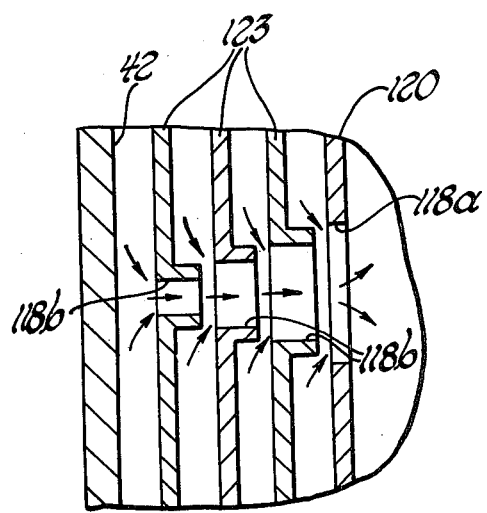
FIG. 11 is a fragmentary portion, in enlarged scale and in cross-section, of yet another arrangement comprising a deluge tank.

A second embodiment or alternate arrangement for the internals of a deluge tank is shown in FIG. 10. The arrangement of FIG. 10 is identical to that of FIG. 9 except for the orifice configuration. That is, instead of a multitude of single orifices 118 in parallel, the embodiment of FIG. 10 provides a multitude of orifices 118a in parallel with all such orifices followed by one or more orifices 118b in series. These orifices in series are provided on one or more concentric cylinders 123 mounted between and including the straight flange region of dished head 116 and open cylinder 120. The in-line series of orifices can be formed as a plate orifice or as orifice tubes as shown in, for example, FIG. 11. Each orifice is adapted to accommodate the increased flow from the upstream orifice. By providing orifices in series quenching of steam carryover into the deluge is followed by added subcooling between the orifice stages. The recirculation of the water within the deluge tank for that in FIG. 10 is reversed from that shown in FIG. 9. In FIG. 10 a number of orifices are positioned at the hemispherical region of dished head 116 to enhance water recirculation for steam quench.

Figure 12:
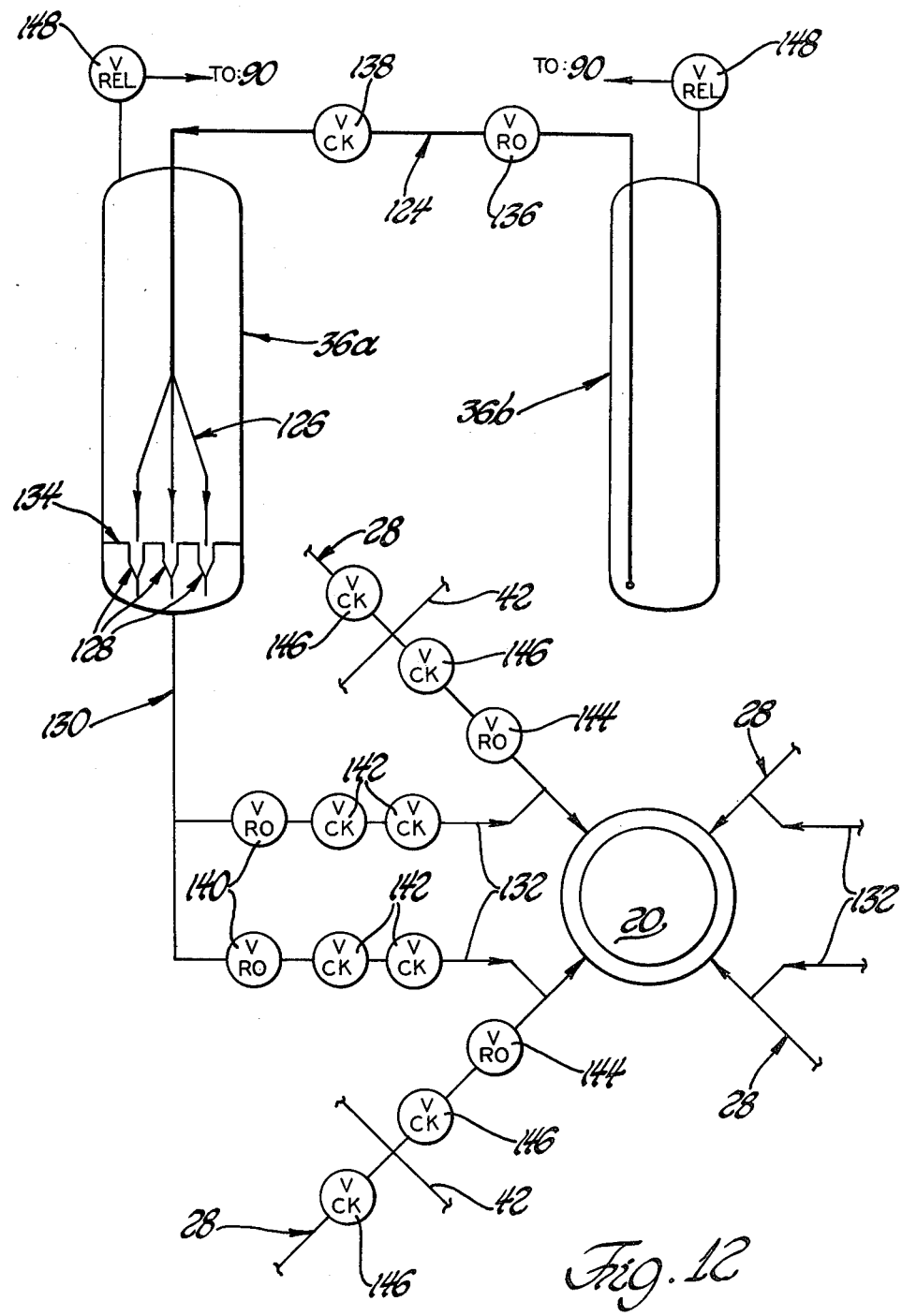
FIG. 12 schematically illustrates one particular arrangement of the reactor vessel refill system.
Figure 13:
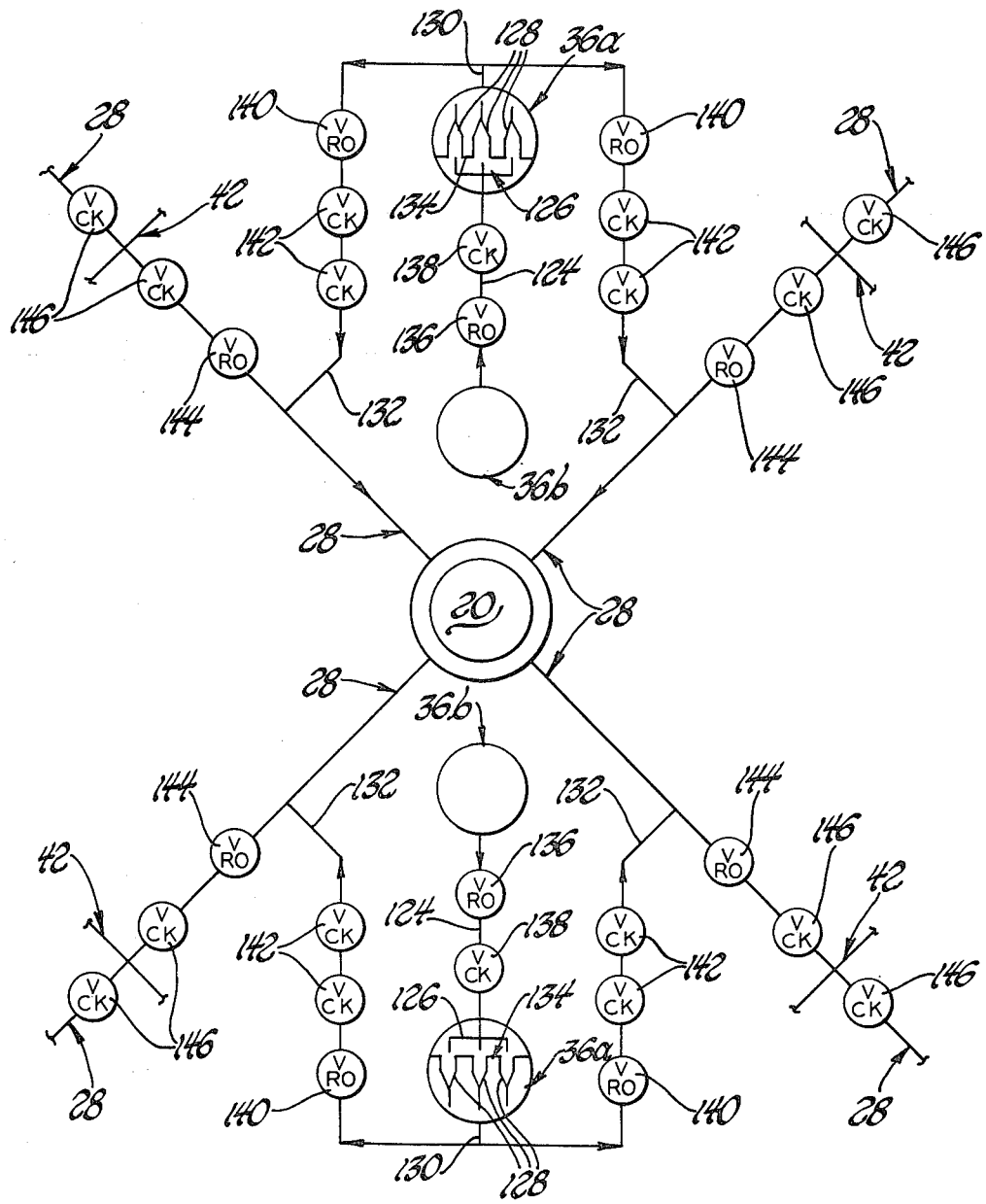
FIG. 13 schematically illustrates another arrangement of the reactor vessel refill system.

FIG. 12 illustrates a typical arrangement for a reactor vessel refill system; two or more refill systems are provided for a Boiling Water Reactor (BWR) unit. Each refill system utilizes jet injectors to refill the reactor vessel in a LOCA. The hot refill tank 36b provides steam for the jet injectors and the cold refill tank 36a provides water that is injected into the reactor vessel 20.

In each refill system a steam header 124 is routed from the hot refill tank into the cold refill tank. Within the cold refill tank the steam header branches into subheaders 126. Each subheader in turn is routed to a jet injector 128. The mixed fluid from the jet injectors is directed into a safety injection header 130. The safety injection header branches into subheaders 132. A safety injection subheader is connected to each feedwater line 28 serving the reactor vessel 20.

Within each cold refill tank 36a one or more jet injectors 128 are mounted on a base plate 134. The suction chamber of each jet injector is open to the treated water within the tank above the base plate to provide a flooded suction. The combining tube of the jet injector is seal welded to the base plate 134 so that a plenum is formed by the base plate and the bottom dished head of the cold refill tank 36a. Thus, the discharge from the jet injectors is directed into the safety injection header 130 from the plenum. Two or more jet injectors 128 in series can be employed to increase the fluid pressure within the plenum open to the safety injector header 130.

For operational purposes normally open remotely-operated shutoff valves and check valves are provided on the connecting piping. Each steam header 124 has a shutoff valve 136 and a check valve 138 in series. Each safety injection subheader 132 has a shutoff valve 140 and two check valves in series 142. Again, each safety injection subheader is connected to a feedwater line 28 at a point between the reactor vessel 20 and a shutoff valve 144. Backflow through the feedwater lines 28 is prevented in a LOCA by two check valves 146 in series; the check valves are positioned to either side of the primary containment steel liner 42. Each refill tank is protected against over-pressure with safety valves 148 that discharge into the deepwell 90.

Each refill tank contains degassed, deoxygenated water with neutron poison, oxygen "getters" and fission product "getters" in solution. Each tank is completely filled with water. The cold refill tanks 36a are at an elevated hydrostatic pressure; a positive displacement pump maintains the hydrostatic pressure.

Each hot refill tank 36b is maintained at an elevated pressure corresponding to the saturation temperature of the fluid therein. Although the hot refill tanks could be maintained with a steam bubble (similar to that in the steam generator of a PWR), hot water at saturation temperature provides more latent energy per unit volume than does steam at the temperature range utilized.

Figure 14:
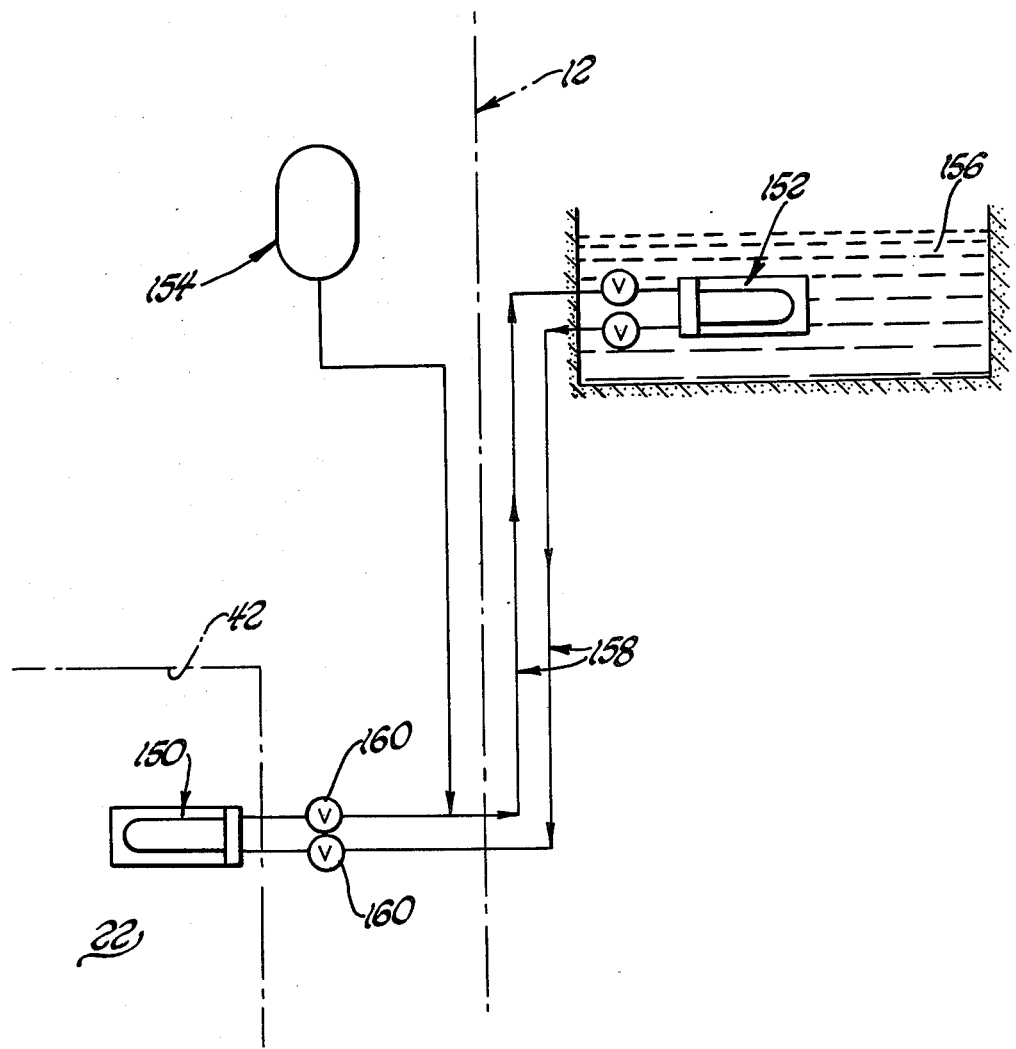
FIG. 14 schematically illustrates an arrangement for one particular circuit in the post-accident heat removal system.

FIG. 14 shows a typical arrangement for one circuit in the post-accident heat removal system. After flooding of the primary reactor containment, the post-accident decay heat removal system becomes effective. For approximately two hours into the post-accident period, the water flooding the containment gradually increases in temperature. After the two hours, the decay heat generation rate decreases sufficiently and, with the increased water temperature in the containment, the heat transfer rate of the post-accident decay heat removal system equals the decay heat generation rate. The containment free volume remains below atmospheric pressure.

After the two hours the continued decrease in the decay heat generation rate causes the water temperature and pressure in the containment to decrease to lower levels.

Four separate post-accident decay heat removal circuits are provided. Each circuit consists of two heat exchangers 150 and 152 and one surge tank 154. One of the two heat exchangers 150 for each circuit is positioned in a steam-line cell 22 provided for each steam-line within the primary reactor containment. The second heat exchanger 152, for each circuit, is located in the cooling pond 156. A closed loop is provided with interconnecting piping 158 for each circuit. The two interconnecting pipes have isolation valves 160 immediately inside the reactor building and at the cooling pond. A surge tank 154 located within the reactor building is provided for each circuit.

In operation, decay heat is transferred from the water flooding the containment to the heat transfer coupling fluid (water) in the closed circuit. The water in the closed circuit transfers the decay heat in turn to the cooling pond through the heat exchanger in the pond.

OPERATION OF INVENTION IN ACCIDENT

The response of the Passive Containment System to a LOCA is described for a Boiling Water Reactor (BWR) Unit in normal operation at 3800 megawatts of thermal energy. In the unit selected the reactor coolant boils on passage through the nuclear fuel assemblies positioned within the core shroud supported inside the reactor vessel 20. A mixture of steam and water flows upward from the core through steam separators and dryers before exiting from the reactor vessel. Steam flows from the reactor vessel through steamlines 24 to the turbine, and the steam flow through the turbine spins a generator to produce electricity. Spent steam from the turbine is condensed within a condenser and pumped back into the reactor vessel through the feedwater lines 28. The condensate returning from the turbine condenser is reheated in feedwater heaters before mixing with water extracted from the steam by the steam separators. This mixed fluid flows downward through the annulus between the core shroud and the reactor vessel in returning to the bottom of the fuel core. A reactor water circulation system 32 provides forced circulation through the nuclear fuel.

The reactor system selected contains approximately 610,000 pounds of reactor coolant (including feedwater and steam) with about 335,000,000 British thermal units (Btu) of stored energy in the coolant at its normal steam pressure in the range of 1050 psia.

The primary reactor containment is designed with a free volume on the order of 100,000 cubic feet. The air in this free space is initially hogged out by steam ejectors and is maintained at less than 2 psia total pressure by the vacuum pumps.

Deluge tanks 40 within the primary reactor containment altogether hold about 5,350,000 pounds of fluid maintained in the 40° to 50° F. range by refrigeration means. The freeboard at the deluge tanks is maintained at less than 2 psia total pressure.

The cold refill tanks 36a are each sized to contain approximately 40° to 50° F. and 500 psia hydrostatic pressure. The hot refill tanks 36b are maintained filled with approximately 340,000 pounds saturated liquid at about 500 psia (467° F.). The safety relief valves 148 on the refill tanks are designed to "pop" in the range of 550 psia pressure.

In the design basis, loss of coolant accident the largest pipe at the reactor water recirculation system 32 ruptures. Reactor coolant blowdown from the open ends of the ruptured pipe ensues. The bulk of the coolant blowdown occurs within 30 seconds.

Reactor coolant blowdown through the pipe rupture pressurizes the primary reactor containment free volume. At about 150 psia pressure, the rupture disks 114 burst and steam carry-over into the deluge tanks 40 takes place. A multiplicity of small vent orifices 118 within the deluge tanks provide sufficient flow area for steam carry-over so that the containment pressure transient is limited to 250 psia during blowdown. The small diameter vent orifices distribute the steam carryover to enhance immediate quenching of the steam by the fluid within the deluge tanks.

The freeboard provides for a designated range of steam carry-over into the deluge tanks. The noncondensables in the primary reactor containment are entrained by the steam and are also considered to be carried over into the deluge tanks. As the deluge tanks are filled by the steam carryover and by the thermal expansion of the contained fluid, coolant blowdown continues to increase the pressure within the primary reactor containment.

As the continued blowdown from the reactor system decompresses the pressure of the remaining coolant within the reactor coolant system below the 500 psia range, the check valves 142 in the safety injection sub-headers 132 between the cold refill tanks 36a and reactor system automatically provide a flow path produced by the pressure difference. The 500 psia hydrostatic pressure within the cold refill tanks is rapidly reduced by the passive injection of the treated water from the tanks into the reactor vessel 20.

As the pressure within the reactor continues to decrease, the pressure at the jet injectors 128 within the cold refill tanks 36a also decreases below the 500 psia range. This results in the flow of wet steam from the hot refill tanks 36b to the jet injectors 128. Steam flow through the injector nozzles entrains water from the cold refill tanks; the steam and water are intimately mixed in passage through the combining tube to provide a homogeneous solution of treated water with neutron poisonous chemicals in solution.

Continued decompression of the coolant still remaining within the reactor coolant system continues to increase the back pressure within the primary reactor containment free volume as the deluge tanks become "water-logged". At approximately 300 psia back pressure in the primary reactor containment, the coolant blowdown from the reactor system is arrested by pressure equalization. With reactor coolant blowdown arrested the injection flow from the jet injectors (designed for about a six inch per second fill rate) continues until the reactor vessel is refilled and an overflow through the pipe rupture occurs. The hot refill tanks 36b continue to provide the operating pressure fluid for the jet injectors 128 until the hot refill tank pressure is approximately equal to the containment back pressure. With pressure equalized the cold refill tanks 36a still contain a small amount of the treated water.

The arresting of reactor coolant blowdown also terminates the carry-over of steam from the containment into the deluge tanks 40. The static head of fluid within the tanks causes a flow reversal through the ruptured disk openings 114. Gravity flow from the deluge tanks fills the containment; the deluge provides a volume of fluid approximately equal to that present in the free volume of the primary reactor containment. Thus, the reactor water recirculation system piping, the feedwater lines and the steamlines are completely submerged by the deluge fluid. The location of any postulated pipe rupture is submerged by the deluge fluid.

After deluge, with temperatures within the primary reactor containment and within the reactor vessel approximately equalized, the weighted average temperature of all fluid is about 160° F. and the containment pressure is about 5 psia. This temperature reflects the total stored energy in the coolant (335,000,000 Btu) and the sensible energy (303,000,000 Btu) in the reactor vessel and internals and the primary piping. Additional energy (77,000,000 Btu) in the form of residual energy from the nuclear fuel is released during the first five minutes after the accident.

In the loss of coolant accident with the nuclear fuel always cooled and with safety injection taking place that effectively refills the reactor vessel within a few minutes after the pipe break, the melting of fuel is prevented. The fission products escaping from the fuel are limited to the "prompt" release that results from mechanical clad failures. This restricts the release to fission products that have migrated to the void space between the fuel and cladding. The "prompt" release is confined to a few percent of the fuel inventories of noble gases and iodines. This release is small compared to the releases which must be assumed in current licensing practices.

The primary container is at elevated pressure only a short time less than five minutes decreasing to 5 psia as a result of the deluge. Any leakage from the primary reactor containment is for the most part retained by auxiliary enclosure within the reactor building. Any leakage through primary reactor containment penetrations is confined within the auxiliary enclosures.

After deluge with its temperature at 160° F., the fluid now flooding the primary reactor containment has sufficient heat capacity to absorb the decay heat generated during the first two hours after the accident without the containment pressure increasing above atmospheric pressure. In this time period the decay heat generation rate has decreased appreciably. The passive heat transfer system is designed to transfer the decay heat at the generation rate present after the two hour period, about 144,000,000 Btu per hour. This heat transfer requirement is actually lower with an accounting for the heat transfer to the outdoors taking place in the first two hours through the post-accident decay heat removal system.

In the Passive Containment System all extrinsic materials are removed from within the primary containment to reduce its size in order to design for the necessary pressure-volume relationship that retains coolant at the fuel during coolant blowdown. These materials include the evacuation of air in addition to the removal of all auxiliary systems, auxiliary components and internal structure. The evacuation of air to a high vacuum eliminates the need for thermal insulation at the reactor coolant system external surfaces.

By removing the extrinsic materials from within the primary container, the internal volume is sufficiently reduced so that small diameter interconnected primary containment cells can be utilized in the Passive Containment System. The cell diameters are reduced by factors of about five to ten as compared to the diameters of existing containment structures for the Boiling Water Reactors. By reducing the containment cylinder diameters by a factor of five or more, the containment peak accident pressure can be increased by approximately the factor of five or more with the same containment wall thickness dimensions for a given material.

The gain in reactor containment design realized by these attributes of the Passive Containment System are readily shown by primary reactor containment net free volume requirement for the various vapor suppression containment systems for nuclear power plants operating in the same power range:

| Type | Volume, Cubic Feet | | |
|---|---|---|---|
| | Drywell | Wetwell | Total |
| Mark I - (Light bulb-torus) | 159,000 | 119,000 | 278,000 |
| Mark II - (Over-under) | 184,000 | 103,000 | 287,000 |
| Mark III - (Weir-wall) | 280,000 | 1,400,000 | 1,680,000 |
| Passive Containment System | | | 100,000 |

This significant reduction in the size of the containment enhances the design bases for the Passive Containment System. The small volume of air enclosed within the primary container is readily hogged out within a two hour period of time by the steam ejectors. Low pressure steam can be used to help flush out the air. A high vacuum (less than 2 psia) is readily maintained with a small vacuum pump; the leakage that can be handled by the pump is higher than the acceptable range of leakage 0.1 to 0.5 percent per day currently in use. Also, during maintenance operations, the primary container is readily ventilated using spool pieces to connect the reactor building ventilation system to the vacuum lines emerging out of the primary container.

Added considerations in the establishment of the primary reactor containment free volume and the design pressure are the accessibility desired for shutdown inspection and maintenance operations; the cross sectional flow areas required for coolant blowdown; and the flooding of the containment with fluid from the deluge and refill tanks.

The Passive Containment System provides the degree of protection required to prevent an adverse temperature rise at the nuclear fuel in a LOCA. Summarizing, the response of the system is to provide a sufficiently high containment back pressure to arrest blowdown with sufficient coolant retained at the fuel for effective heat transfer. Rapid passive injection of treated fluid takes place through all feedwater lines at the reactor vessel to refill the reactor vessel for continued heat removal. Passive heat transfer circuits provide decay heat rejection for the post-accident period. Optimization of the design back pressure becomes a part of the detailed design of the nuclear power plant.

The Passive Containment System provides protection for an accidental reactor transient which results in a pressure surge that is beyond the capability of the multiplicity of relief and safety valves on the steamlines. A transient of this type may result from common mode failures that negate reactor scram. This protection takes the form of rupture disks mounted at flanged openings at the upper end of the reactor vessel or off the steam headers. The rupture disks are designed to burst at a specified pressure that exceeds the 10 percent margin above the maximum allowable working pressure for the safety valves as prescribed by code for nuclear power plants.

As an example, a pressure surge that exceeds the maximum allowable working pressure of the reactor coolant system by 15 to 20 percent bursts the rupture disks. This produces a controlled loss of coolant accident in those parts of the reactor system that results in the least disturbance. The reactor transient is checked by steam voids at the core and is completely shutdown by the neutron poisonous fluid injected into the reactor vessel from the refill tanks. The balance of the passive containment system is equally as effective throughout the accident period as in the LOCA.

The passive containment system is designed to safely accommodate the range of pipe breaks that are beyond the makeup capability of the feedwater pumps. The passive containment system can also accommodate faults with a break size that varies with time, i.e., a hairline crack that initially weeps and then rapidly develops into a pipe rupture.

Means are provided at the primary containment for the rapid detection of coolant leakage and also the place at which the leak is occurring before the point of leakage has time to develop in size. These means include condensation and filtering of the containment exhaust at the vacuum pump inlet. The exhaust is monitored for radioactivity, and also for liquid carry-over utilizing an electrode (spark plug) technique. Electrodes mounted for leak detection are also positioned at each drain point.

The stored deluge fluid and the hot and cold refill fluid have various chemicals in solution to serve as neutron poisons, oxygen "getters" and fission product "getters". The neutron poisons considered may include but are not limited to boron, cadmium and hafnium. In addition to operating the primary container at a high vacuum and degassing the fluids, additives such as hydrazine and sodium sulphite can be used as oxygen "getters". The fission product "getters" may include but are not limited to sodium hydroxide and sodium thiosulphate.

A small enclosed volume in the primary container enhances the inherent safety features of the Passive Containment System that prevents the combustion of radiolytic hydrogen. This hydrogen is formed from the decomposition of water by the high intensity gamma radiation present within the reactor vessel. The combustion of hydrogen is prevented by oxygen depletion; the small primary container is pumped down to a high vacuum so that only a trace amount of oxygen is present; the dissolved oxygen concentration in the deluge and refill fluid is depleted by mechanical deaeration and by chemical deaeration to remove the last traces of the dissolved oxygen; also a sufficient amount of residual chemical deaerant is added to the deluge fluid to completely scavenge the radiolytic oxygen formed (for example 400 parts per million or more of sodium sulphite). Also, the low coolant temperature after deluge keeps radiolytic hydrogen below the flammable temperature range.

The invention hereof can be usefully applied to nuclear reactors employing light and heavy water. Because of longer experience with light water breeder reactors (LWBR) and the compelling need for urban siting of such power plants, the instant disclosure importantly makes possible the realization of such installations within economic constraints, and within the desired radius of cities. Such underground or underwater installations for LWBR are readily possible by employing the inventive concept herein.

Radioactivity containment is of prime concern in the instant invention. Containment during normal operation as well as during LOCA, and particularly during post accident heat removal requirement, by employing novel high vacuum conditions is now possible through the instant disclosure and its related teachings. The invention lends itself to a practical design for power reactors in that the free volume hereof required for containment purposes between the inner and outer chambers is realistically small and economically very desirable. Biological containment is inherent.

It should, of course, be obvious that the specific disclosure of the invention herein made is by way of illustration and not limitation.

Although only a preferred embodiment and selected modifications of the invention have been disclosed and described, it is apparent that other embodiments and modifications of the invention are possible within the scope of the appended claims.

I claim:

1. Energy absorbing and quenching apparatus for use in absorbing thermal energy from a vaporized fluid contained within a chamber of a confining structure, said apparatus comprising tank means, cooling liquid contained within said tank means, said cooling liquid being of such a volumetric displacement within said tank means as to result in a selected freeboard space within said tank means, passage means formed in said tank means and effective for communicating between said chamber and a lower disposed portion of said cooling liquid within said tank means, pressure responsive valve means operatively closing said passage means and effective for preventing said cooling liquid to flow from said tank means through said passage means to said chamber during normal conditions and prior to said vaporized fluid attaining a first predetermined pressure within said chamber, said valve means being effective upon said vaporized fluid attaining said first predetermined pressure to open communication through said passage means as between said cooling liquid and said chamber thereby permitting said vaporized fluid to start to flow through said passage means and into said cooling liquid while maintaining said cooling liquid within said tank means to thereby transfer heat energy from said vaporized fluid to said cooling liquid and to develop steam within said freeboard space, and said cooling liquid being effective upon sufficient steam being formed within said freeboard space to flow out of said tank means through said passage means and into said chamber to provide quenching of said vaporized fluid within said chamber.

2. Energy absorbing and quenching apparatus for use in absorbing thermal energy from a vaporized fluid contained within a chamber of a confining structure, said apparatus comprising tank means, cooling liquid contained within said tank means, said cooling liquid being of such a volumetric displacement within said tank means as to result in a selected freeboard space within said tank means, passage means formed in said tank means and effective for communicating between said chamber and a lower disposed portion of said cooling liquid within said tank means, pressure responsive valve means operatively closing said passage means and effective for preventing said coolin liquid to flow from said tank means through said passage means to said chamber during normal conditions and prior to said vaporized fluid attaining a first predetermined pressure within said chamber, said valve means being effective upon said vaporized fluid attaining said first predetermined pressure to open communication through said passage means between said cooling liquid and said chamber thereby permitting said vaporized fluid to start to flow through said passage means and into said cooling liquid while maintaining said cooling liquid within said tank means to thereby transfer heat energy from said vaporized fluid to said cooling liquid and to develop steam within said freeboard space, and said cooling liquid being effective upon sufficient steam being formed within said freeboard space to flow out of said tank means through said passage means and into said chamber to provide quenching of said vaporized fluid within said chamber, said pressure responsive valve means comprising rupture disk means, and wherein said rupture disk means prior to experiencing rupture has one side exposed to the hydrostatic pressure of said cooling liquid and an other side opposite to said one side exposed to the pressure within said chamber.

3. Energy absorbing and quenching apparatus according to claim 2 and further comprising orifice means situated within said tank means in relatively close proximity to said valve means, said orifice means functioning to provide flow paths for said vaporized fluid as said vaporized fluid enters said tank means and cooling liquid upon opening of said valve means.

4. Energy absorbing and quenching apparatus according to claim 3 and further comprising baffle means situated within said tank means in order to define circulating flow paths through said cooling liquid for such of said vaporized fluid as flows into said cooling liquid.

5. Energy absorbing and quenching apparatus according to claim 2 and further comprising baffle means situated within said tank means in order to define circulating flow paths through said cooling liquid for such of said vaporized fluid as flows into said cooling liquid.

6. Energy absorbing and quenching apparatus for use in absorbing thermal energy from a vaporized fluid contained within a chamber of a confining structure, said apparatus comprising tank means, cooling liquid contained within said tank means, said cooling liquid being of such a volumetric displacement within said tank means as to result in a selected freeboard space within said tank means, passage means formed in said tank means and effective for communicating between said chamber and a lower disposed portion of said cooling liquid within said tank means, pressure responsive valve means operatively closing said passage means and effective for preventing said cooling liquid to flow from said tank means through said passage means to said chamber during normal conditions and prior to said vaporized fluid attaining a first predetermined pressure within said chamber, said valve means being effective upon said vaporized fluid attaining said first predetermined pressure to open communication through said passage means as between said cooling liquid and said chamber thereby permitting said vaporized fluid to start to flow through said passage means and into said cooling liquid while maintaining said cooling liquid within said tank means to thereby transfer heat energy from said vaporized fluid to said cooling liquid and to develop steam within said freeboard space, said cooling liquid being effective upon sufficient steam being formed within said freeboard space to flow out of said tank means through said passage means and into said chamber to provide quenching of said vaporized fluid within said chamber, and orifice means situated within said tank means in relatively close proximity to said valve means, said orifice means functioning to provide flow paths for said vaporized fluid as said vaporized fluid enters said tank means and cooling liquid upon opening of said valve means.

7. Energy absorbing and quenching apparatus for use in absorbing thermal energy from a vaporized fluid contained within a chamber of a confining structure, said apparatus comprising tank means, cooling liquid contained within said tank means, said cooling liquid being of such a volumetric displacement within said tank means as to result in a selected freeboard space within said tank means, passage means formed in said tank means and effective for communicating between said chamber and a lower disposed portion of said cooling liquid within said tank means, pressure responsive valve means operatively closing said passage means and effective for preventing said cooling liquid to flow from said tank means through said passage means to said chamber during normal conditions and prior to said vaporized fluid attaining a first predetermined pressure within said chamber, said valve means being effective upon said vaporized fluid attaining said first predetermined pressure to open communication through said passge means as between said cooling liquid and said chamber thereby permitting said vaporized fluid to start to flow through said passage means and into said cooling liquid while maintaining said cooling liquid within said tank means to thereby transfer heat energy from said vaporized fluid to said cooling liquid and to develop steam within said freeboard space, said cooling liquid being effective upon sufficient steam being formed within said freeboard space to flow out of said tank means through said passage means and into said chamber to provide quenching of said vaporized fluid within said chamber, and baffle means situated within said tank means in order to define circulating flow paths through said cooling liquid for such of said vaporized fluid as flows into said cooling liquid.

* * * * *

UNITED STATES PATENT AND TRADEMARK OFFICE
CERTIFICATE OF CORRECTION

PATENT NO. : 4,210,614
DATED : July 1, 1980
INVENTOR(S) : Frank W. Kleimola

It is certified that error appears in the above-identified patent and that said Letters Patent are hereby corrected as shown below:

Column 12, line 56, immediately after "approximately" insert --- 1,000,000 pounds of treated water maintained in the range of ---.

Claim 2, at line 13 thereof, change "coolin" to --- cooling ---.

Signed and Sealed this

Thirteenth Day of October 1981

[SEAL]

Attest:

Attesting Officer

GERALD J. MOSSINGHOFF
Commissioner of Patents and Trademarks